United States Patent Office 3,036,008
Patented May 22, 1962

3,036,008
PERMANENT MAGNET FERRITE
Godshalk Berge, Skokie, Ill., assignor, by mesne assignments, to Magneco Electronics, Inc., Addison, Ill.
No Drawing. Filed Dec. 24, 1956, Ser. No. 630,023
17 Claims. (Cl. 252—62.5)

This invention relates to permanent magnets and relates more particularly to the manufacture of permanent magnets by combining materials formed by treating mixtures of powdered metal compounds, and then magnetizing the resulting product.

Permanent magnets have been made from metal oxides such as the oxides of iron, barium, strontium, lead and cobalt and from alloys of metals such as aluminum, nickel, cobalt, iron, molybdenum, tungsten, copper, silver, manganese, and vanadium. Permanent magnets most generally in use at the present time are of the aluminum-nickel-cobalt-iron alloy type. These permanent magnets are quite costly and much research and experimentation have been and are being carried on to discover an effective permanent magnet which may be produced at low cost. As a feature of my invention, I provide a ferrite type compound which, when magnetized yields a permanent magnet of fine characteristics and which may be sold at a fraction of the cost of the aluminum-nickel-cobalt-iron permanent magnet. The ferrite type magnetic material of my invention can be manufactured economically from readily available compounds. Thus, from relatively inexpensive metal compounds such as barium oxide (BaO), barium carbonate ($BaCO_3$), or other barium compounds yielding barium oxide upon thermal treatment, ferric oxide ($F_2O_3$) and manganese dioxide ($MnO_2$), I have produced permanent magnets in which the residual magnetism (B$r$), namely, the magnetism that remains in the compound after the magnetizing force (H) has been withdrawn, is extremely high, i.e., on the order of 2800 or more gausses. The coercive force (H$c$), i.e., the negative or demagnetizing force that tends to reduce the residual magnetism to zero, of the magnetic material of my invention is also high, as it must be in order that the permanent magnet produced therefrom function under various conditions where they may be opposing fields, and is on the order of 2200 or more oersteds. Moreover, my novel magnetic material has exceptional ability to concentrate a magnetic field when a magnetizing force is applied thereto. The degree of concentration is known as the flux density (B) and is normally measured in kilogausses. The magnetizing force (H), the magnetic flux density (B) and the coercive force (H$c$) can all be found on the usual hysteresis curve.

Another factor that must be known, in addition to the magnetic flux density (B), the residual magnetism (B$r$) and the coercive force (H$c$) necessary to reduce the magnetism to zero, is the maximum energy of the magnet. This maximum energy is known as BH max. and is derived from the hysteresis curve. Actually, it is necessary to graph alongside the hysteresis curve a curve in which BH is one factor and H is the other factor. A line parallel to the abscissa will intersect the hysteresis curve at the point where the product of B and H will be maximum. A simpler way of accomplishing the same thing for all practical purposes is to draw a line parallel to OH on the hysteresis curve extending from B$r$ and a similar vertical line extending upwardly from the maximum H$c$. A line drawn diagonally from the point where these two lines meet towards zero will intersect the hysteresis curve at BH max.

As those skilled in the art know, to be effective the residual magnetism and the coercive force of permanent magnets should be as high as possible in order to provide adequate external fields and also to insure the retention of the magnetic strength under adverse demagnetizing conditions. In the permanent magnets of my invention, the maximum energy product (BH max.), which is related to the product of residual magnetism and coercive force, is desirably high. The maximum energy product, which can be defined as the product of the flux density (B), and the magnetizing force (H) at the most efficient operating point of a permanent magnet, is herein expressed as multiplied by $10^6$ to give a more convenient figure, in the manner employed in the art.

The permanent magnets of my invention are formed by mixing together two compounds, namely, barium ferrite ($BaO \cdot yFe_2O_3$) and barium manganite ($BaO \cdot MnO_2$), and ball-milling the resulting mixture to a very fine powder, preferably to a particle size below five (5) microns. I have found that by mixing from 94% to 99.5% by weight of barium ferrite and 6% to .5% by weight of barium manganite, I produce the mixtures which form highly satisfactory materials which, when magnetized, make very effective permanent magnets. To the powdered mixture of the barium ferrite and barium manganite is added a lubricant and binder which is preferably one which will completely volatilize or be completely consumed during the sintering. An example of such a lubricant and binder is Neofat (which is marketed by Armour & Company). The powdered mixture including the lubricant and binder is then molded to the desired configuration by compression molding at high pressures of about 2,000 to 20,000 pounds per square inch or by extrusion molding at substantially lower pressures, after which the molded article is subjected to a sintering step. The sintering step is effected by heating the molded article in a furnace in the presence of an oxidizing atmosphere within a temperature range of about 1600° F. to about 2700° F. for from ½ to 6 hours depending upon the size of the article and the temperature employed. It will be appreciated that small articles and high temperatures require shorter heating periods.

I prefer to form the barium ferrite and the barium manganite separately in the following manner:

The barium ferrite is made by reacting 12% to 17% by weight of finely powdered barium oxide with 88% to 83% by weight of ferric oxide, also in finely powdered form. Since barium oxide cannot conveniently be handled in a factory, I prefer to form the barium ferrite by employing barium carbonate in place of the barium oxide. In the latter case 15.5% to 21.8% by weight of finely powdered barium carbonate are reacted with 84.5% to 78.2% by weight of ferric oxide. Specifically, the barium and iron compounds in finely divided form are first intimately mixed together and then water is added in a quantity sufficient to form a "dough-like" mixture. The water is then driven off by drying under very low heat conditions, namely, at a temperature of approximately 250° F. Thereafter, the dried material is sintered in a furnace at a temperature of approximately 1900° F. to 2300° F. for a period of 4 hours to 6 hours. The compound formed is barium ferrite ($BaO \cdot yFe_2O_3$) where $y$ is from about 5 to 7 and preferably 6 to 7 the latter being shown in the examples hereinafter set forth.

The barium manganite may be made by reacting about 64% by weight of barium oxide with about 36% by weight of manganese dioxide. However, here again I prefer to use barium carbonate instead of barium oxide whereupon the quantities of the reactants will be about 71% by weight of barium carbonate and about 31% by weight of manganese dioxide. The finely powdered barrium and manganese compounds are mixed together and treated with water, and then sintered in the same manner as above set forth in the case of the preparation of the barium ferrite. The product formed from the barium and manganese compounds is barium manganite ($BaO \cdot MnO_2$).

The following examples, which are illustrative only, give further details of the preparation of the permanent magnets in accordance with my invention.

*Example I*

Barium ferrite is made in accordance with the above-outlined process employing 14% by weight of barium oxide and 86% by weight of ferric oxide, and barium manganite is made in accordance with the above-outlined process employing 64% by weight of barium oxide and 36% by weight of manganese dioxide. 97% by weight of the barium ferrite and 3% by weight of the barium manganite are mixed together and this mixture is ball-milled to a very fine powder of a particle size below five (5) microns. A lubricant and binder, Neofat, is mixed with the powder mixture and the so-treated powder mixture is pressed to the desired shape by compression molding. The molded article is sintered at a temperature of 2100° F. to 2400° F. A magnetizing force of about 20,000 ampere turns per linear inch is then applied to the sintered molded article.

The permanent magnet thus produced has the following characteristics:

Residual magnetism ($Br$): 2800 gausses; coercive force ($Hc$): 2230 oersteds; and maximum energy (BH max.): $1.62 \times 10^6$.

*Example II*

Barium ferrite is made in accordance with the above-outlined process employing 14% by weight of barium oxide and 86% by weight of ferric oxide, and barium manganite is made in accordance with the above-outlined process employing 64% by weight of barium oxide and 36% by weight of manganese dioxide. 98% by weight of the barium ferrite and 2% by weight of the barium manganite are mixed together and this mixture is ball-milled to a very fine powder of a particle size below five (5) microns. A lubricant and binder, Neofat, is mixed with the powder mixture, and the so-treated powder mixture is pressed to the desired shape by compression molding. The molded article is sintered at a temperature of 2100° F. to 2400° F. A magnetizing force of about 20,000 ampere turns per linear inch is then applied to the sintered molded article.

The permanent magnet thus produced has the following characteristics:

Residual magnetism ($Br$): 2820 gausses; coercive force ($Hc$): 2220 oersteds; and maximum energy (BH max.): $1.6 \times 10^6$.

*Example III*

Barium ferrite is made in accordance with the above-outlined process employing 12.1% by weight of barium oxide and 87.9% by weight of ferric oxide, and barium manganite is made in accordance with the above-outlined process employing 64% by weight of barium oxide and 36% by weight of manganese dioxide. 96% by weight of the barium ferrite and 4% by weight of the barium manganite are mixed together and this mixture is ball-milled to a very fine powder of a particle size below five (5) microns. A lubricant and binder, Neofat, is mixed with the powder mixture, which powder mixture is pressed to the desired shape by compression molding and sintered at a temperature of 2100° F. to 2400° F. A magnetizing force of about 20,000 ampere turns per linear inch is then applied to the sintered molded article.

The permanent magnet thus produced has the following characteristics:

Residual magnetism ($Br$): 2830 gausses; coercive force ($Hc$): 2230 oersteds; and maximum energy (BH max.): $1.62 \times 10^6$.

The permanent magnets made in accordance with my invention, as indicated above, have highly satisfactory magnetic characteristics. In addition, the cost of my permanent magnets are less than 15% of the cost of permanent magnets of the aluminum-nickel cobalt-iron alloy type because of the fact that I have eliminated the use of expensive metal compounds required in the making of such alloys. Accordingly, my contribution to the art is considerable.

I claim:

1. The method of making permanent magnets comprising mixing together barium ferrite and barium manganite, the barium ferrite being present in the mixture in major proportion, grinding said mixture to a very fine powder of a particle size below five (5) microns, adding a lubricant and binder to said powder mixture, molding said mixture of powder mixture and lubricant and binder into the desired form, sintering the molded product for at least one hour in an oxidizing atmosphere at a temperature of from about 2100° F. to about 2400° F., and subjecting the sintered molded product to a magnetizing force.

2. Method of making permanent magnets comprising forming barium ferrite by reacting a barium compound with ferric oxide and forming barium manganite by reacting a barium compound with manganese dioxide, mixing together the barium ferrite and barium manganite to form a mixture containing a preponderating proportion of barium ferrite, grinding said mixture to a very fine powder of a particle size below five (5) microns, adding a lubricant and binder to said powder mixture, molding said mixture of powder mixture and lubricant and binder into the desired form, sintering the molded product for at least one hour in an oxidizing atmosphere at a temperature of from about 2100° F. to about 2400° F., and subjecting the sintered molded product to a magnetizing force.

3. A ferrite material which, when magnetized, forms a permanent magnet, made by sintering a compacted mixture of finely divided barium ferrite and barium manganite, at about 2100° F. to 2400° F. for one-half to four hours in an oxidizing atmosphere, said barium ferrite consisting essentially of $BaO \cdot yFe_2O_3$ where $y$ is about five to seven, and comprising a major portion of said mixture, and said barium manganite consisting essentially of $BaMnO_3$ comprising the remaining portion of said mixture.

4. A ferrite material which, when magnetized, forms a permanent magnet, made by sintering a compacted mixture of finely divided barium ferrite and barium manganite, at about 2100° F. to 2400° F. for one-half to four hours in an oxidizing atmosphere, said barium ferrite consisting essentially of $BaO \cdot yFe_2O_3$ where $y$ is about five to seven and comprising about 94 to 98.5 percent by weight of said mixture, and said barium mannnite consisting essentially of $BaMnO_3$ comprising the remaining portion of said mixture.

5. A ferrite material which, when magnetized, forms a permanent magnet having a residual magnetism of about 2800 gausses, coercive force of about 2200 oersteds and maximum energy of about $1.6 \times 10^6$ when subjected to a magnetizing force, made by sintering at about 2100° F. to 2400° F. for one-half to four hours in an oxidizing atmosphere, a compacted mixture of finely divided barium ferrite and barium manganite; said barium ferrite consisting essentially of $BaO \cdot yFe_2O_3$ where $y$ is about five to seven and comprising about 94 to 98.5 percent by weight of said mixture; and said barium manganite consisting essentially of $BaMnO_3$ comprising the remaining portion of said mixture; removing the reacted material from the heat source and magnetizing it when cooled to form a permanent magnet.

6. A ferrite material which, when magnetized, forms a permanent magnet having a residual magnetism of about 2800 gausses, coercive force of about 2200 oersteds and maximum energy of about $1.6 \times 10^6$ when subjected to a magnetizing force, made by sintering at about 2100°

F. to 2400° F. for one-half to four hours in an oxidizing atmosphere, a compacted mixture of finely divided barium ferrite and barium manganite; said barium ferrite consisting essentially of $BaO \cdot yFe_2O_3$ where $y$ is about five to seven and comprising about 94 to 97 percent by weight of said mixture; and said barium manganite consisting essentially of $BaMnO_3$ comprising the remaining portion of said mixture; removing the reacted material from the heat source and magnetizing it when cooled to form a permanent magnet.

7. A ferrite material which, when magnetized, forms a permanent magnet, made by sintering a compacted mixture of finely divided barium ferrite and barium manganite, at about 2100° F. to 2400° F. for one-half to four hours in an oxidizing atmosphere, said barium ferrite consisting essentially of $BaO \cdot yFe_2O_3$ where $y$ is about five to seven and comprising about 94 to 97 percent by weight of said mixture, and said barium manganite consisting essentially of $BaMnO_3$ comprising the remaining portion of said mixture.

8. A ferrite material which, when magnetized, forms a permanent magnet, made by sintering a compacted mixture of finely divided barium ferrite and barium manganite, at about 2100° F. to 2400° F. for one-half to four hours in an oxidizing atmosphere, said barium ferrite consisting essentially of $BaO \cdot yFe_2O_3$ where $y$ is about five to seven and comprising about 94 to 98.5 percent by weight of said mixture, and said barium manganite consisting essentially of $BaMnO_3$ comprising the remaining portion of said mixture; the resultant product consisting essentially of a product having the formula $x(BaO \cdot yFe_2O_3)BaMnO_3$ where $x$ is a number from 3 to 14, and $y$ is a number from 5 to 7.

9. The method of making a composition of matter which, when magnetized, forms a permanent magnet comprising: mixing finely divided barium ferrite and barium manganite; the barium ferrite being present in the mixture in a proportion of about 94 to 98.5 percent by weight and having been formed by sintering a compacted mixture of finely divided barium carbonate and ferric oxide for four to six hours at a temperature of about 1900° F. to 2300° F., the molar ratio of said ferric oxide to barium carbonate having been about five to seven to one; the said barium manganite having been formed by sintering at 1900° F. to 2300° F. for four to six hours, a compacted mixture of finely divided barium carbonate and manganese dioxide in equal molar ratio; grinding said mixture of barium ferrite and barium manganite to a very fine powder of a particle size below five (5) microns; adding a lubricant and binder to said powder mixture; compacting said mixture of powder, lubricant, and binder into the desired form; and sintering the formed product at a temperature of from about 2100° F. to about 2400° F. for about one-half to four hours in an oxidizing atmosphere.

10. The method of making a composition of matter which, when magnetized, forms a permanent magnet comprising: mixing finely divided barium ferrite and barium manganite; the barium ferrite being present in the mixture in a proportion of about 94 to 97 percent by weight and having been formed by sintering a compacted mixture of finely divided barium carbonate and ferric oxide for four to six hours at a temperature of about 1900° F. to 2300° F., the molar ratio of said ferric oxide to barium carbonate having been about five to seven to one; the said barium manganite having been formed by sintering at 1900° F. to 2300° F. for four to six hours, a compacted mixture of finely divided barium carbonate and manganese dioxide in equal molar ratio; grinding said mixture of barium ferrite and barium manganite to a very fine powder of a particle size below five (5) microns; adding a lubricant and binder to said powder mixture; compacting said mixture of powder, lubricant, and binder into the desired form; and sintering the formed product at a temperature of from about 2100° F. to about 2400° F. for about one-half to four hours in an oxidizing atmosphere.

11. The method of making a composition of matter which, when magnetized, forms a permanent magnet comprising: mixing finely divided barium ferrite and barium manganite; the barium ferrite being present in the mixture in a proportion of about 94 to 98.5 percent by weight and consisting essentially of $BaO \cdot yFe_2O_3$ where $y$ is about five to seven, said barium manganite consisting essentially of $BaMnO_3$; grinding said mixture of barium ferrite and barium manganite to a very fine powder of a particle size below five (5) microns; adding a lubricant and binder to said powder mixture; compacting said mixture of powder, lubricant, and binder into the desired form; and sintering the formed product at a temperature of from about 2100° F. to about 2400° F., for about one-half to four hours in an oxidizing atmosphere.

12. The method of making a composition of matter which, when magnetized, forms a permanent magnet comprising: mixing finely divided barium ferrite and barium manganite; the barium ferrite being present in the mixture in a proportion of about 94 to 97 percent by weight and consisting essentially of $BaO \cdot yFe_2O_3$ where $y$ is about five to seven, said barium manganite consisting essentially of $BaMnO_3$; grinding said mixture of barium ferrite and barium manganite to a very fine powder of a particle size below five (5) microns; adding a lubricant and binder to said powder mixture; compacting said mixture of powder, lubricant, and binder into the desired form; and sintering the formed product at a temperature of from about 2100° F. to about 2400° F., for about one-half to four hours in an oxidizing atmosphere.

13. The method of making a composition of matter which, when magnetized, forms a permanent magnet, having a residual magnetism of about 2800 gausses, coercive force of about 2200 oersteds and maximum energy of about $1.6 \times 10^6$ when subjected to a magnetizing force, comprising: mixing finely divided barium ferrite and barium manganite; the barium ferrite being present in the mixture in a proportion of about 94 to 98.5 percent by weight and having been formed by sintering a compacted mixture of finely divided barium carbonate and ferric oxide for four to six hours at a temperature of about 1900° F. to 2300° F., the molar ratio of said ferric oxide to barium carbonate having been about six to seven to one; the said barium manganite having been formed by sintering at 1900° F. to 2300° F. for four to six hours, a compacted mixture of finely divided barium carbonate and manganese dioxide in equal molar ratio; grinding said mixture of barium ferrite and barium manganite to a very fine powder of a particle size below five (5) microns; adding a lubricant and binder into the desired form; and sintering the formed product at a temperature of from about 2100° F. to about 2400° F., for about one-half to four hours in an oxidizing atmosphere; removing the reacted material from the heat source and magnetizing it when cooled to form a permanent magnet.

14. The method of making a composition of matter which, when magnetized, forms a permanent magnet, having a residual magnetism of about 2800 gausses, coercive force of about 2200 oersteds and maximum energy of about $1.6 \times 10^6$ when subjected to a magnetizing force, comprising: mixing finely divided barium ferrite and barium manganite; the barium ferrite being present in the mixture in a proportion of about 94 to 97 percent by weight and having been formed by sintering a compacted mixture of finely divided barium carbonate and ferric oxide for four to six hours at a temperature of about 1900° F. to 2300° F., the molar ratio of said ferric oxide to barium carbonate having been about six to seven to one; the said barium manganite having been formed by sintering at 1900° F. to 2300° F. for four to six hours, a compacted mixture of finely divided barium carbonate and manganese dioxide in equal molar ratio; grinding said mixture of barium ferrite and barium manganite to a very fine powder of a particle size below five (5) microns; adding a lubricant and binder into the desired form; and sintering the formed product at a temperature of from about 2100° F. to about 2400° F., for about one-half to four hours in an oxidizing atmosphere; removing the reacted material from the heat source and magnetizing it when cooled to form a permanent magnet.

15. A permanent magnet formed by sintering in an oxidizing atmosphere within a temperature range of 1600° F. to 2700° F. for from one half to six hours a compacted mixture of about 98 percent, by weight, of barium ferrite and about 2 percent by weight, of barium manganite; and magnetizing the sintered product, said permanent magnet having a residual magnetism of 2820 gausses, a coercive force of 2220 oersteds and maximum energy of $1.62 \times 10^6$.

16. A permanent magnet formed by sintering in an oxidizing atmosphere within a temperature range of 1600° F. to 2700° F. for from one half to six hours a mixture of about 96 percent, by weight, of barium ferrite and about 4 percent, by weight, of barium manganite; magnetizing the sintered product, said permanent magnet having a residual magnetism of 2830 gausses, a coercive force of 2230 oersteds and maxium energy of $1.6 \times 10^6$.

17. A permanent magnet formed by sintering in an oxidizing atmosphere within a temperature range of 1600° to 2700° F. for from one half to six hours a mixture of about 97 percent, by weight, of barium ferrite and about 3 percent, by weight, of barium manganite; magnetizing the sintered product, said permanent magnet having a residual magnetism of 2800 gausses, a coercive force of 2230 oersteds and maximum energy of $1.62 \times 10^6$.

References Cited in the file of this patent

UNITED STATES PATENTS

| | | |
|---|---|---|
| 2,700,023 | Albers-Schoenberg | Jan. 18, 1955 |
| 2,762,778 | Gorter | Sept. 11, 1956 |
| 2,827,437 | Rathenau | Mar. 18, 1958 |
| 2,837,483 | Hakker et al. | June 3, 1958 |
| 2,847,101 | Bergmann | Aug. 12, 1958 |

FOREIGN PATENTS

| | | |
|---|---|---|
| 927,259 | Germany | May 2, 1955 |
| 694,554 | Great Britain | Jan. 22, 1952 |
| 760,799 | Great Britain | Nov. 7, 1956 |

OTHER REFERENCES

"Phillips Technical Review," pub. Nov. 30, 1956, vol. 18, No. 6, pages 145–154.

Gorter: Proceedings of IRE, December 1955, 1952–1954.